United States Patent [19]

Daniel

[11] Patent Number: 4,715,700
[45] Date of Patent: Dec. 29, 1987

[54] LIGHT EMITTING OPTICAL FIBER ASSEMBLIES INCLUDING LIGHT CONTROLLING

[76] Inventor: Maurice Daniel, 550 Jaycox Rd., Avon Lake, Ohio 44012

[21] Appl. No.: 731,511

[22] Filed: May 7, 1985

Related U.S. Application Data

[62] Division of Ser. No. 427,155, Sep. 29, 1982, Pat. No. 4,519,017.

[51] Int. Cl.$^4$ .......................... G02B 6/36; G02B 7/00; G02B 17/00; G02B 6/26

[52] U.S. Cl. ............................... 350/618; 350/96.10; 350/276 R; 350/574; 350/321

[58] Field of Search ............... 350/618, 619, 622, 623, 350/574, 321, 286, 276 R, 96.10, 96.25, 96.15, 96.18, 96.19

[56] References Cited

U.S. PATENT DOCUMENTS

| | | | |
|---|---|---|---|
| 3,751,658 | 8/1973 | Arnold | 350/276 R |
| 3,901,582 | 8/1975 | Milton | 350/96.19 |
| 4,217,026 | 8/1980 | Radovich | 350/276 SC |
| 4,280,751 | 7/1981 | DiVita | 350/96.18 |

Primary Examiner—Jon W. Henry
Attorney, Agent, or Firm—Sixbey, Friedman & Leedom

[57] ABSTRACT

The light emitting optical fiber assemblies include light emitting panels that employ a nonwoven geometric grid of light emitting optical fibers which can be arranged to permit air to pass through the panel or to define apertures providing access through the panel. Also, such nonwoven fiber grids can be arranged to permit the panels to be cut or sectioned without losing all light emitting capability. Panels are provided which include the encapsulation of light emitting fibers in a light transmitting laminate, and the laminate is provided with light scattering formations which permit light to be emitted from the encapsulating layer. The panels and other light emitting units are provided with light or electromagnetic radiation from lightpipe harness assemblies which are designed to supply light to a plurality of use devices.

7 Claims, 32 Drawing Figures

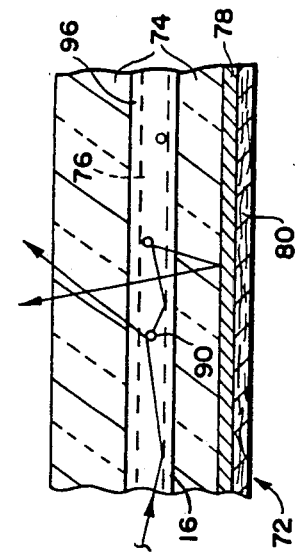
FIG. 13.
FIG. 12.
FIG. 11.
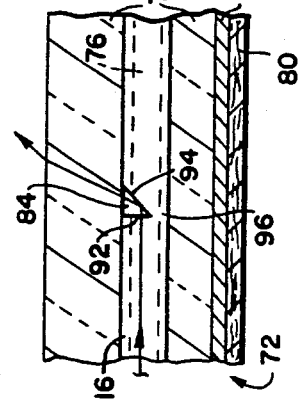
FIG. 14.
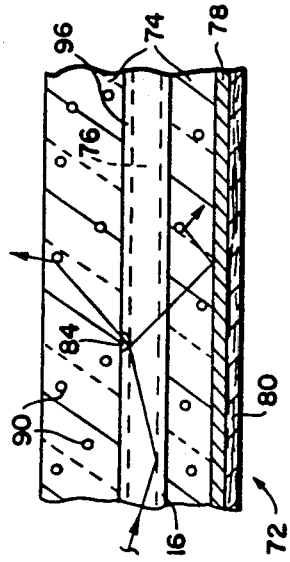
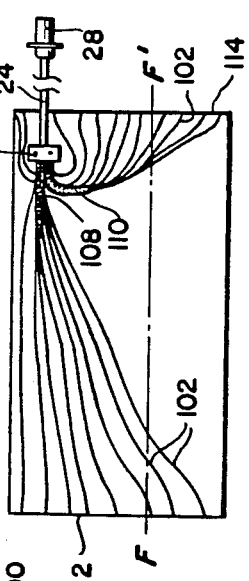
FIG. 16.
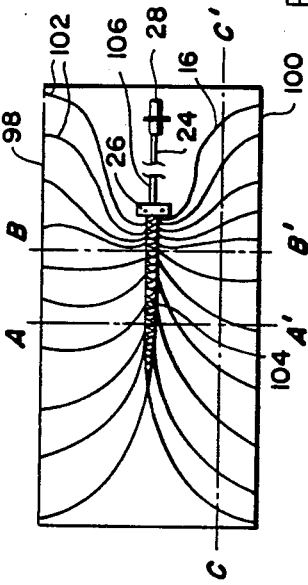
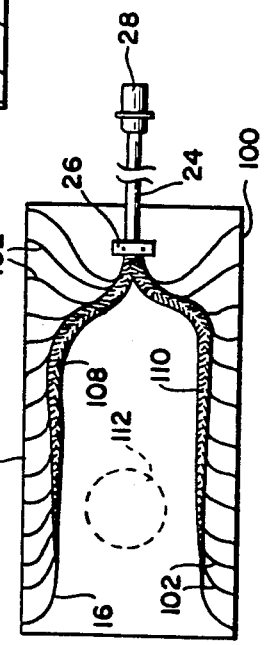
FIG. 15.

LIGHT EMITTING OPTICAL FIBER ASSEMBLIES INCLUDING LIGHT CONTROLLING

This application is a division of application Ser. No. 427,155 filed Sept. 29, 1982, now U.S. Pat. No. 4,519,017.

TECHNICAL FIELD

This invention relates to light emitting optical fiber assemblies generally and more particularly to fixtures and panels formed from a geometric grid arrangement of light emitting optical fibers.

BACKGROUND ART

In recent years, a number of different methods have been developed for causing conventional optical fibers to emit light. U.S. Pat. Nos. 3,508,589 to B. N. Derick et al and 4,234,907 to M. Daniel disclose methods for causing clad or unclad optical fibers to emit light along the length of the fiber. This may be accomplished by scratching, abrading, chemically deforming, or otherwise removing or disturbing portions of the cladding of the optical fibers so that a small percentage of light travelling down the length of the fibers is emitted through the deformities in the cladding. Similarly, light emission may be achieved by providing optical fibers having a core region which is doped with refractive and/or reflective light scattering particles to provide enhanced, uniform light emission along the length of the optical fiber without the need for fiber deformation.

Panels with surfaces composed of light emitting woven optical fibers have been proposed by the aforementioned Derick et al and Daniel patents, while panels composed of strips of light conducting glass or plastic, such as described in U.S. Pat. No. 4,172,631 to Yevick, have been proposed as a means of producing a light emitting panel. However, panels constructed in accordance with these prior art methods have proven difficult to fabricate, since panels formed with light conducting glass or plastic strips require that each strip be cut with great precision. On the other hand, panels formed from woven light emitting optical fibers require the use of complex fiber weaving machines and an expensive weaving process.

DISCLOSURE OF THE INVENTION

It is a primary object of the present invention to provide a novel and improved lighting assembly employing optical light emitting fibers that are gathered into a fiber bundle which is optically connected to a source of electromagnetic radiation.

Another object of the present invention is to provide a novel and improved nonwoven geometric grid lighting assembly which includes one or more rigid frames upon which light emitting optical fibers are stretched and attached to form a geometric grid pattern. The optical fibers are gathered into an optical fiber bundle attached to the frame, and this fiber bundle is terminated at a source of electromagnetic radiation.

A further object of the present invention is to provide a novel and improved nonwoven, geometric grid lighting panel which includes light emitting optical fibers stretched and attached to a rigid or semi-rigid backing panel to form a geometric grid pattern. The fibers are arranged in a pattern on the front face of the panel and are gathered into an optical fiber bundle attached to the back of the panel.

Yet another object of the present invention is to provide a novel and improved nonwoven, geometric grid lighting panel which includes light emitting optical fibers attached to a rigid or semi-rigid backing panel. At the back of the panel, the fibers are directed in a sweeping curve to a fiber bundle. The fibers and fiber bundles are arranged to permit the panel to be cut without losing light emitting capability.

Another object of the present invention is to provide a novel and improved lighting panel formed with a woven or nonwoven grid of light emitting optical fibers encapsulated in a refractive medium. The optical fibers are formed to emit light along their length into the encapsulating medium, and a scattering mechanism is provided to direct at least some of the light into the region beyond the panel.

A further object of the present invention is to provide a novel and improved lighting assembly employing light emitting fibers which are connected to receive electromagnetic energy from a lightpipe harness. This lightpipe harness is formed of a bundle of lightpipe rods which all begin at an input end and terminate at various output points. At least some portion of the rods are fused together with sufficient length to form an optical mixer, and the inside wall surface of the harness is made reflective to electromagnetic energy. The harness has one or more input optical windows and at least two or more optical output windows to direct electromagnetic radiation from a source means to points of usage.

Another object of the present invention is to provide a novel and improved lightpipe harness assembly formed from a bundle of lightpipe rods having a cross-sectional area which is constant along their respective lengths. The rods are all equal in cross-sectional area to provide an equal light output at a plurality of output points.

A further object of the present invention is to provide a novel and improved segmented lightpipe harness assembly for providing electromagnetic energy from a source to a plurality of optical fiber lighting units. This segmented lightpipe harness includes individual lightpipe rod sections which are split into two or more branches, each of which constitutes a subdivision of the initial section cross-sectional area. The ratio of the transmitted electromagnetic radiation intensity is determined by the ratio of the branch to rod section cross-sectional areas. The main branch of each rod section continues without change in cross-sectional area to the next section where the lightpipe means abruptly increases in area. The smaller secondary branch lines distribute the radiation to optical fiber light fixtures.

A still further object of the present invention is to provide a novel and improved light transmitting assembly including an optical diode structure which permits light to travel in only one direction. This diode structure consists of flat or curved perpendicular mirror elements which face the reverse flowing light and angled mirror surfaces which face the forward flowing light. The angled mirror surfaces shield the perpendicular mirror elements from the forward flowing light.

BRIEF DESCRIPTION OF THE DRAWINGS

FIGS. 9–13 are sectioned cross sectional views of laminated light emitting panels of the present invention;

FIGS. 14–18 are diagrammatic plan views of the back sides of light emitting panels of the present invention;

BEST MODE FOR CARRYING OUT THE INVENTION

Figure 1:
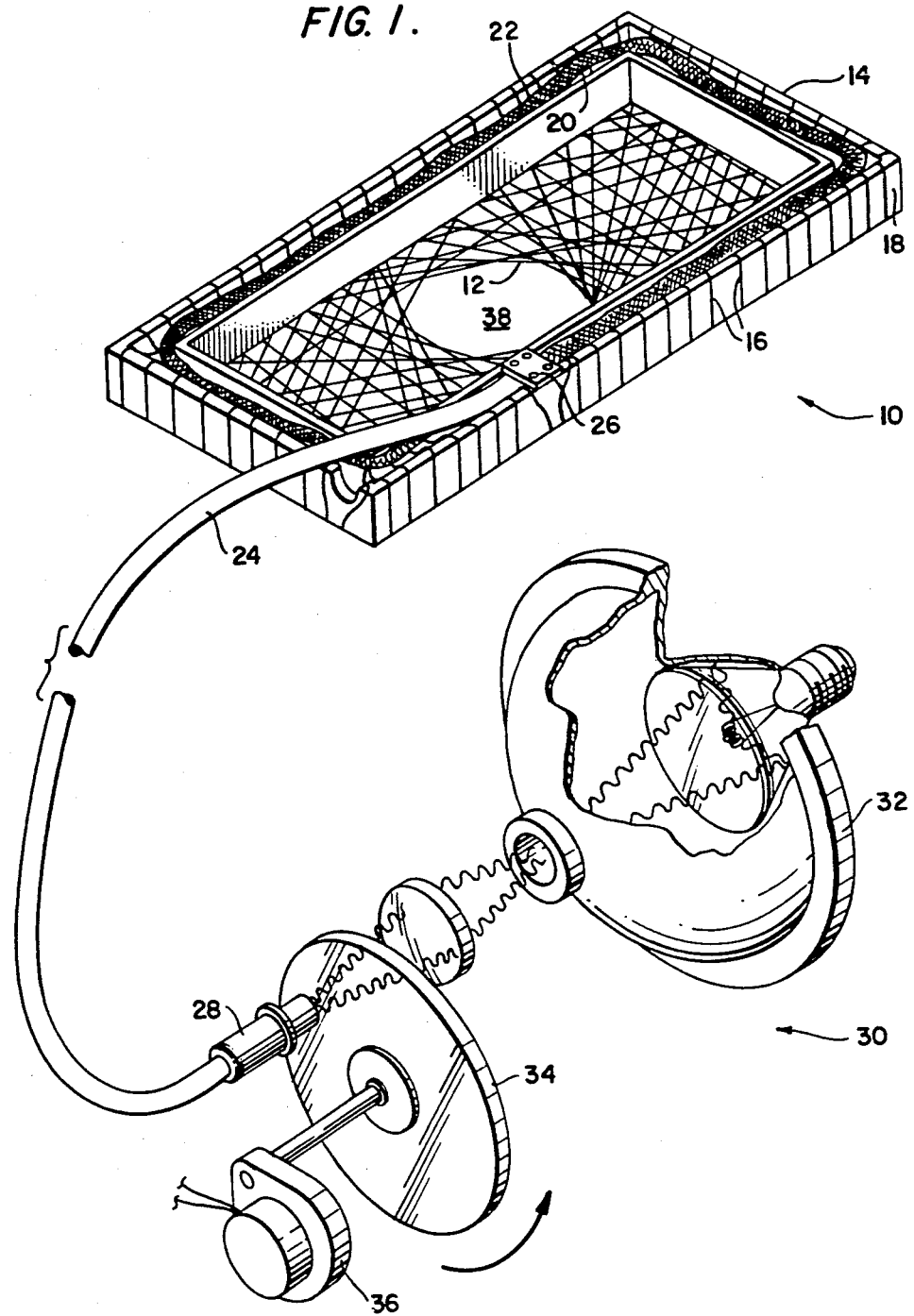
FIG. 1 is a perspective partially sectioned view of a nonwoven geometric grid light emitting panel assembly of the present invention.

FIG. 1 discloses a basic embodiment of the light emitting panel assembly 10 of the present invention which employs a nonwoven geometric grid 12 in the formation of a light emitting panel 14. In this panel, the geometric grid 12 of light emitting optical fibers 16 is stretched and mounted across a central opening defined by a rigid frame 18 of metal or plastic and glued in place along the edges of the frame. The optical fibers 16 are then continued around to the back side of the frame where they are directed into a groove or trough 20 which extends completely around the back of the frame 18. The optical fibers are first braided into an optical fiber bundle 22 which rests in the groove 20. After all of the optical fibers are collected into a braided bundle, the bundle is coated with various protective plastic coatings and the like and thus made into a lightpipe cable 24 which extends outwardly away from the panel 14. A clamp or bracket 26 or an application of epoxy is used to affix the optical fiber bundle/cable to the frame at the junction between the optical fiber bundle 22 and cable 24. The lightpipe cable may be made to extend for any useful length and is terminated with a lightpipe coupler 28 which is plugged into any suitable light source 30. In this case, the light source 30 consists of an optical fiber illuminator bulb 32 described in U.S. Pat. No. 4,241,382 to M. Daniel, wherein the light from an internal light source is focused by a lens onto the window of the lightpipe coupler. The light may be beamed through a color wheel or color filter means 34 as shown in FIG. 1 which may be rotated by a motor 36.

In FIG. 1, the light emitting optical fibers 16 are shown arranged in a geometric grid pattern which has a circular aperture 38 at its center. Outwardly of the aperture, the optical fibers have been arranged in a pattern having a uniform density of optical fibers, thus providing a uniform light emission in these regions of the grid. A pattern having a aperture of this type is not possible to achieve using optical fiber light emitting woven textiles, since the aperture would have to be cut into the fabric, thus causing diminished light output in some of the optical fiber threads. This destroys the uniformity of the light emission.

When light emitting optical fiber grids are fabricated into units such as ceiling tiles, the aperture 38 can prove very useful, for a nonwoven panel with this aperture will facilitate the passage of air conditioning ducts or provide access to valves, smoke detectors, fire extinguisher sprayers, ceiling mounted spotlights, and other ceiling mounted devices. The relatively wide spacing between individual optical fibers 16 forming the grid 12 also permits the free flow of air through the grid. This arrangement is useful on basement ceilings where free flowing air is needed to prevent the build-up of damp air and the resulting growth of mildew.

Figure 2:
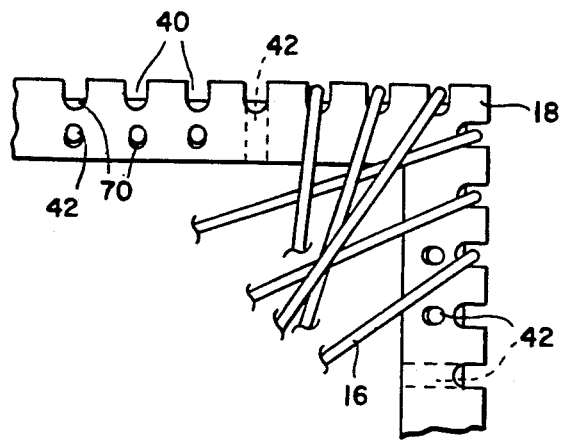
FIG. 2 illustrates a section of a frame used in the panel of FIG. 1.

In a nonwoven geometric grid arrangement, the optical fibers 16 must be affixed to a frame 18 or other rigid support means. The optical fibers may be clamped, glued, tied in place, or otherwise affixed to such support means. In FIG. 2, the optical fibers 16 are strung between notches 40 spaced along the outside edge of the frame 18 and may additionally be glued into place. The frame or other support means may have numerous small holes 42 through which the optical fibers are stung. These small holes may extend between the edges of the frame as shown in broken lines in FIG. 2 or between the sides of the frame. Any combination of the above attachment means may be employed to affix the optical fibers to the frame.

Figure 3A:
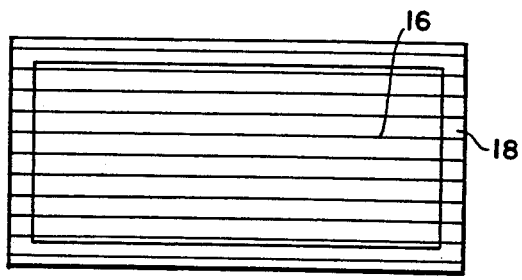
FIGS. 3a–3f are diagrammatic plan views of nonwoven geometric grid light emitting panels including peripheral frame supports.
Figure 3B:
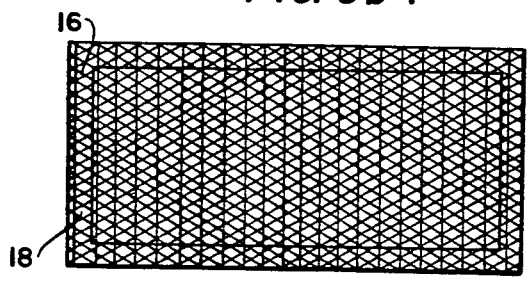
Figure 3C:
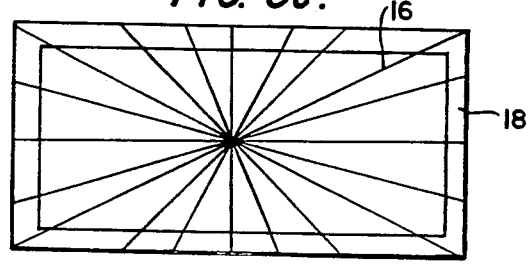

FIGS. 3a through 3f illustrate a number of different geometric arrangements of nonwoven light emitting optical fiber grids. FIG. 3a shows a simple arrangement of the optical fibers on the frame 18 whereby the optical fibers are simply stretched longitudinally across the frame. In FIG. 3b, the optical fibers are stretched in a hexoganal pattern across the frame 18, while in FIG. 3c, the optical fibers are stretched to form a single point burst pattern. Clearly this pattern could be repeated on the same frame to yield a number of single point burst patterns on the same frame. In place of the single point burst pattern, a circular burst pattern, such as shown in FIG. 1, could be placed anywhere within the frame 18. Several such circular burst patterns, having different sized circles, could be arranged within the same frame.

Figure 3F:
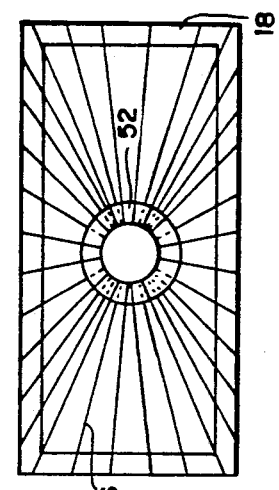
Figure 3E:
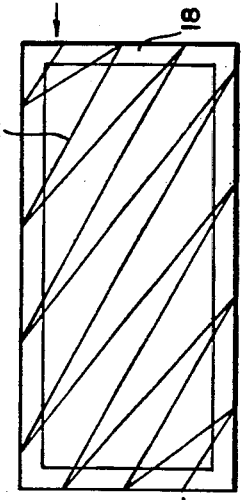
Figure 3D:
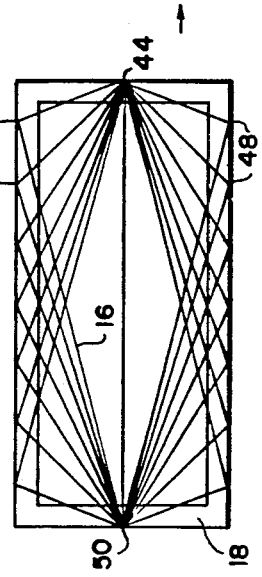

In FIG. 3d, a two point pattern is shown in which all the optical fibers begin at one point 44 and travel to one edge of the frame (46 or 48) where they are affixed in place and then continue to travel to the second point 50. This type of pattern can be extended by having more than two points of origin and/or by having the individual optical fibers affixed to more than one point along the frame before reaching their exit point 50. In FIG. 3e, a zig-zag pattern is shown which uses a single thick optical fiber. Additional fibers could be added to make this type of pattern more complex.

Finally, in FIG. 3f, a circular element 52 made of plastic or the like is shown suspended at the center of the frame by the optical fibers it supports. The individual optical fibers originate at one edge of the frame, travel through the center of the circular element, and then back to the edge of the frame near where they originated. Non-optical fiber strings, wires, or the like could also be used to suspend the circular element. Clearly non-circular elements could also be suspended at the center of the frame by the same methods and more than one such suspended element 52 could be suspended within the same frame means.

The grid patterns shown in FIGS. 3a–3f are only a few of the many types possible using nonwoven geometric grids of light emitting optical fibers and any combination of these nonwoven patterns are also possible. Clearly the number of possible grid geometries far exceed those possible in woven textile products, thus allowing greater aesthetic expression and product utility.

Figure 4:
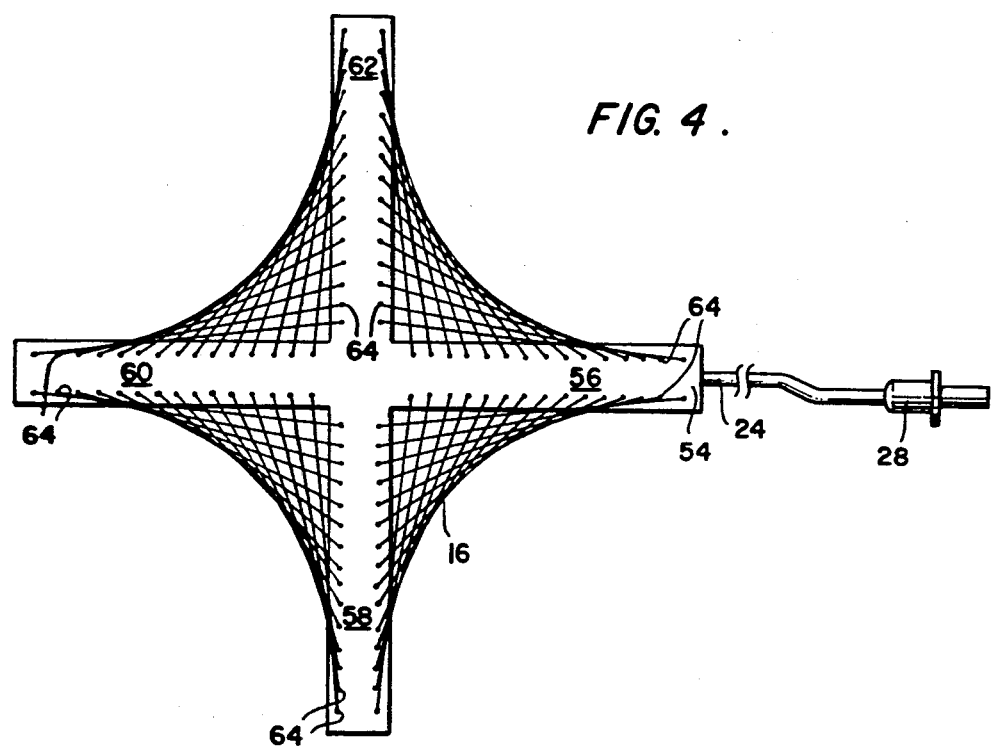
FIG. 4 is a view in front elevation of a nonwoven geometric grid light emitting fixture of the present invention.

It is not necessary that light emitting optical fiber grids be mounted on square or rectangular frames 18, but instead, the support means may be designed to facilitate a wide range of useful pattern geometries. One such possible geometry is illustrated in FIG. 4. Here the frame 54 is in the shape of a cross, and the arms 56,58, 60 and 62 of the cross are hollow and perforated by a number of small holes 64 spaced longitudinally along their edges. The optial fibers 16 pass through these holes to the interior of each arm where they are gathered into braided optical fiber bundles as in FIG. 1. At the point where all the optical fibers have been collected together, the bundle is given various protective coatings and thus made into a lightpipe cable 24 which then passes out through the end of one arm 56 of the cross support 54. The lightpipe is made some useful length and terminated with a lightpipe coupler 28 which is plugged into a light source similar to that illustrated in FIG. 1. The light source could be recessed into the ceiling of a room with its female coupling means opening into the room. The geometric grid of light emitting optical fibers shown in FIG. 4 then becomes a novel lighting fixture after being plugged into the ceiling light source.

Clearly the grid and support illustrated in FIG. 4 can be greatly increased in complexity. Additional arms of different lengths may be added; the arms may be curved; branched arms may be employed, the widths and lengths of the arms may vary; or other useful geometric variations may be incorporated in the support arm structure. Also the arms need not be hollow, but instead, the optical fibers may be collected into bundles which run along the outside surface of the arms. The optical fibers may be collected into more than one bundle to form a plurality of lightpipe means which pass from one or more arms to more than one light source. Not all of the support arms need to have optical fiber bundles running along them, but alternatively they may simply have a series of holes or pins along an edge or line to secure the optical fibers and direct them elsewhere where they would be collected into bundle and lightpipe assemblies. In some special cases, the optical fibers may be affixed along one arm and cut so that they release whatever light has not already emitted along their length as a bright point of light. Conventional threads or filaments may also be interlaced between the support arms along with the optical fibers. These conventional threads or filaments may be colored transparent plastic or glass or they may be made of highly reflective wire or plastic. They may also be made of transparent plastic having prismoidal cross-sections that cause dispersion of the transmitted light into spectrums of light, or the like.

The support arms 56-62 may be made of transparent plastics, glass, chrome plated material, or other decorative substances, and may be rigid or of limited flexibility. Also, the structure of FIG. 4 may be used to replace the circular element 52 of FIG. 3e and would be suspended within the frame 18 by threads, wires, optical fibers, or the like. Wires, strings or the like stretched between rigid supports may in some cases, in turn, support light emitting optical fibers 16.

These concepts illustrated in FIG. 4 may be employed to fabricate complex, many faceted, geometric shapes such as spherical burst patterns or the tear-drop burst patterns of chandeliers. However, they may also be applied to the rectangular frame light fixtures illustrated in FIG. 1 which can be mounted in hanging ceiling grids or which can be made into wall-mounted or free standing panels. In this case, rigid plastic or metal mounting arms or other support means would be attached to the frame 18 at its ends and would project out of the plane of the frame. Thus, in a 2 by 4 foot ceiling frame, many layers and facets of smaller light emitting optical fiber grids, such as those of FIG. 4, may be mounted on the frame 18 to extend 4 to 6 inches out of the plane of the frame. These aesthetically pleasing complex light emitting grids could be used to cover ceilings, walls, partitions, or other accent or decorative surfaces. The light emitting optical fiber grid of FIG. 4 is shown to be supported by its lightpipe cable and coupling. It could instead be suspended by a decorative chain, pipe, cable, rope, or the like with the lightpipe cable 24 loosely wrapped around or extending through such supporting means so that the lightpipe cable would then not be required to carry the weight of the fixture. By the use of suitable brackets, the fixture of FIG. 4 could be attached to a side wall of a room instead of the ceiling. This fixture could also be made into a lamp with the base of said lamp containing the light source. The multi-faceted optical fiber grids could then be fabricated to burst forth from the lamp base forming the light source housing. Such optical fiber grid lamps could be free standing on the floor or made for placement on tables or the like, and may incorporate mirrors, lenses, colored filters, and other passive optical elements in their design. Such lighting fixtures may also include light bulbs, fluorescent or neon tube lights, or other conventional lighting means as part of the overall fixture.

An extension of the light emitting optical fiber geometric grid concept of FIG. 1 is to replace the frame 18 with a solid backing panel of plywood, fiberboard, pressboard, metal, plastic or the like. The result is a flat base panel 66 on which the light emitting optical fibers are stretched in the same fashion as they were stretched and mounted on a frame. The resulting light emitting panel can be used in much the same manner as the frame version, except that air can no longer flow freely through the plane of the geometric grid. However, such panels can be made sound absorbing if the backing panel 66 is formed from material which is a sound absorbing substance such as fiberboard, plastic foam, or other sound absorbing panel means. All the geometric patterns of optical fibers possible with a frame mounted grid are also possible with panel mounted optical fibers. In fact, variations of the patterns containing an aperture which passes through the panel, such as illustrated in FIGS. 1 and 3e, are also possible using a panel backing having such a hole drilled through it before the optical fibers are mounted on said panel backing. As before, these holes may be circular, rectangular, irregular, or of any other useful geometry or dimension.

Figure 6:
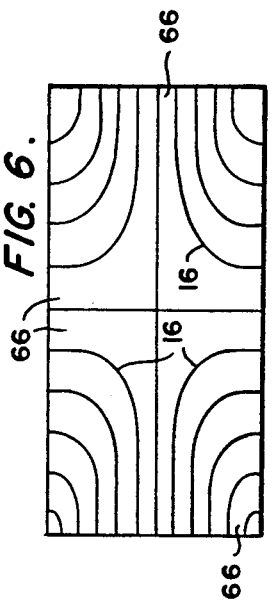
FIGS. 5–8 are diagrammatic plan views of solid light emitting panels having nonwoven geometric grids formed in accordance with the present invention.
Figure 5:
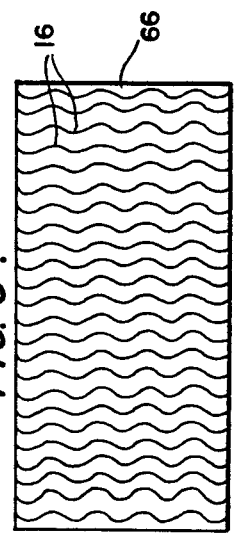

For panel backed, geometric grids, the optical fibers 16 may be glued or otherwise affixed to the entire face of the backing panel 66 instead of having to be affixed to the edges of the panel. This possibility greatly extends the usefulness of geometric grid panels in new and novel ways not possible with either framed nonwoven grids or with woven light emitting fabrics mounted on panels. By gluing the nonwoven optical fibers to the face of the panel it is no longer necessary to stretch the optical fibers between the edges of a support means, and the optical fibers may therefore be laid out in any desired curve on the panel surface as exemplified in FIGS. 5 and 6. In FIG. 5, the optical fibers 16 are given a decorative wave pattern and then glued in place on the backing panel 66, while in FIG. 6, the optical fibers are given sweeping curves such that this regular pattern may be matched with adjacent panels 66 for a repeating pattern effect across many such panels (four in FIG. 6). Complex lace or embroidery-like patterns of light emitting optical fibers may also be mounted on a backing panel, and obviously many very complex curve patterns are possible. These curve patterns may be combined with any of the straight line patterns previously described or alluded to. In both the geometric frame or support mounted grids of FIGS. 1–4 and in woven light emitting fabric mounted panels, the optical fibers are more or less restricted to travel in straight lines. Nonwoven geometric grids mounted upon solid backing panels 66 therefore offer a substantial increase in design flexibility.

The base support panel 66 for a geometric grid may be made of practically any material for decorative purposes, and may have a wide range of useful shapes, such as the shapes of alphanumeric characters. Also the mounting of optical fibers 16 on a panel backing provides the possibility of drilling small holes 68 in the panel backing and of having a single optical fiber emerge from one hole and exit around the panel edge or through a second small hole to form an optical fiber line segment. Obviously, small groups of optical fibers may also be arranged to likewise emerge or exit from holes in the panel surface. Two examples of such midpanel emergance of optical fibers are illustrated in FIGS. 7 and 8.

Figure 7:
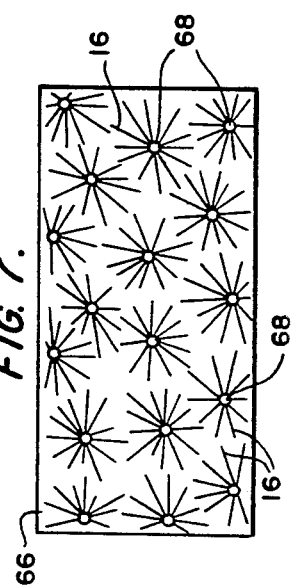

In FIG. 7, the optical fibers 16 are arranged to emerge in small groups from randomly placed holes 68 in the panel backing. The emerging light emitting optical fibers are trimmed to a fixed length and arranged to form burst patterns. The fiber ends may be left uncoated so that a bright point of light appears at the end of each optical fiber segment.

Figure 8:
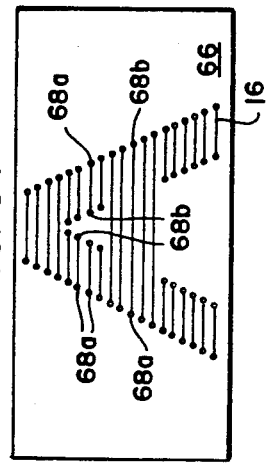

In FIG. 8, the light emitting optical fibers 16 are arranged to emerge from one small hole 68a and exit into another small hole 68b. The over-all pattern of holes is arranged to form the letter "A", in this case. This method of stringing the optical fibers through small holes in a panel makes it possible to create light emitting line segments of various lengths on a panel surface as shown, and these optical fiber segments may be arranged in curves as well as straight lines. The fibers can also be arranged to cross over one another on the panel surface. The use of optical fiber line segments may be combined with any of the previous teachings concerning panel mounted optical fiber grids or panels made by affixing light emitting optical fibers to a panel surface or lamination or the like.

Optical fibers leak a large percentage of the light travelling through them when they are sharply bent. This is due to the fact that an optical fiber permits light to escape through the fiber cladding layers when the relative angle between the light beam and the cladding layer is greater than a specific critical angle. Thus, a fiber which is bent around the sharp edge of a frame, panel, or the lip of a small hole will leak a large percentage of light in the region of the bend. Unless this is a desired design effect, care must be taken to round off such sharp edges so as to keep the resulting light losses within acceptable limits. A radius of curvature of one quarter inch is generally acceptable for the DuPont 0.01 inch in diameter Crofon ® plastic optical fibers. All edges on the frames and panels of this invention can be given curvatures of this amount without interfering with the utility, function, or aesthetics of the resultant products. Special care is needed in making small drill holes for stringing optical fibers through a panel. Such holes need to have a curved notch pressed or cut in the lip of the hole such that the optical fiber lies in such a curved notch as it enters or exits from the small hole. This becomes evident from a consideration of FIG. 2 wherein rounded edges 70 are provided at the outlets of the notches 40 and the holes 42.

To further reduce light leakage along a sharp edge, the optical fibers 16 may be given a reflective coating of reflective paint, chemically deposited metal, or other reflective material. By this means, some of the light that would normally leak out around the bend in the optical fiber will strike the reflective coating and be sent back into a trapped condition within the fiber. Generally this coating of paint, plastic, epoxy, or the like should have the lowest possible optical index of refraction to cause total internal reflection of as many of the low angle light rays as possible. Paint or epoxy or the like having a reflective metal pigment could be used to prevent light leakage at sharp bends. However, a paint having a white pigment such as titanium oxide, which scatters light, could also be used with some success in cases where the optical fibers have a large critical angle of light acceptance.

In the past, it has been assumed that a laminated light emitting panel can be constructed by coating the surface of a woven light emitting fabric covered panel with a transparent medium such as plastic, epoxy, glass, or the like. In such a laminated light emitting panel, the transparent coating medium encapsulates the light emitting optical fibers, thereby coming into optical contact with the fibers, and any deformities provided therein to cause light emission. It has also been assumed that the light rays travelling through the core region of the optical fibers will encounter a deformity in the cladding and/or core of the otpcial fiber which will cause some of the light to be directed into the encapsulating medium. This escaped light will either eventually strike the bottom surface which will reflect the light upwards to the top surface, or it will directly strike the top surface. It has been theorized that some of the light striking the top surface will then be refracted into the air above the panel.

The aforesaid concepts have been found to be erroneous, for in fact, only very small amounts of light can be emitted by panels having this construction, and this low intensity light is generally caused by multiple reflections at optical boundries which have not previously been recognized. In order to emit light from any type of optical fiber light emitting panel having a laminating medium encapsulating the optical fibers, some sort of light scattering mechanism must be provided. Without a light scattering mechanism, light rays emerging from a deformity in the optical fiber will emerge in the forward direction from said deformity at a small angle with respect to the longitudional axis of the optical fiber. When the small angle light rays strike the top surface of the encapsulating medium, they will generally be within the critical angle requirements for total internal reflection, and thus most of the light rays will be prevented from escaping from the encapsulating medium. Light rays thus trapped in the encapsulating medium will generally be quickly attenuated by the relatively high light absorbtivity of the medium.

In the past, it has been theorized that an effective laminated light emitting panel can be constructed with optical fibers encapsulated in a transparent medium or layer if the encapsulating medium has an index of refraction that is equal to or less then that of the optical fiber core material. However, when the encapsulating medium has a relatively low index of refraction, it serves the same function as a cladding, that is it serves to trap the light within the optical fiber core material by the mechanisn of total internal reflection. If the encapsulating medium has the same index of refraction as the optical fiber core material, then light may escape from regions of the optical fiber where the cladding has been removed, but the light will have low escape angles which will keep it trapped within the encapsulating medium as stated above. Some sort of light scattering means is essential to the emission of light from optical fibers of known type which have been treated so as to emit light along their lengths when such fibers are in optical contact with an encapsulating medium. Until now, it has not been recognized that an additional light scattering means is necessary to effectively overcome the light trapping effects of the encapsulating medium.

FIGS. 9–13 disclose light emitting laminated panels 72 formed in accordance with the present invention wherein additional light scattering configurations are provided to overcome the light trapping effects of a light fiber encapsulating medium. In each of these panels, the optical fibers may be woven fibers of the type known to the prior art or the nonwoven geometric light emitting grids of the types previously described. In each panel, the fibers 16 are encapsulated within a transparent medium or layer 74 formed of a material that has an index of refraction that is equal to or greater than the index of refraction of the core 76 of the optical fibers. The panel also includes a reflective layer 78 and a support layer 80, which may be the same as the support layer 66 previously described. Variations in this arrangement could be used wherein the reflective and support layers are eliminated and the encapsulating medium serves as the sole support for the fibers 16 so that light is emitted from both the front and back surfaces of the panel 72. This could not be accomplished with the panel of FIG. 10 where the reflective layer is required.

In the panels of FIGS. 9–12, the cladding 82 and in some instances, the core 76 of the fibers 16 is deformed along the fiber length as indicated at 84 to provide light emitting deformities. When the encapsulating medium 74 has an index of refraction which is equal to or greater than the index of refraction of the fiber core 76, most of the light striking the area of deformity 84 will escape into the encapsulating medium. The greater the index of refraction of the encapsulating medium above that of the core material, the greater will be the average angle of the escaping light. However, unless the light is further scattered, it remains trapped within the encapsulating medium by total internal reflection, and increasing the index of refraction of the encapsulating medium will not solve this problem since the critical angle thereof changes so as to continue trapping the light.

Figure 9:
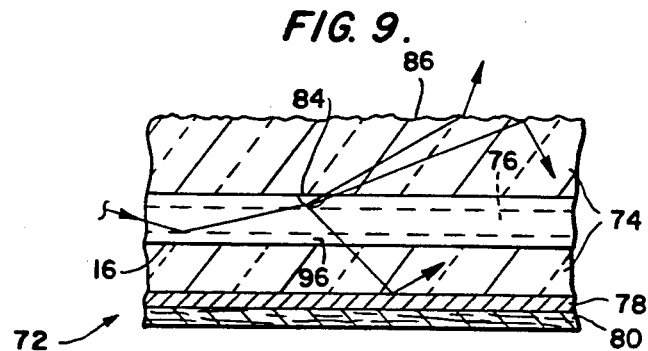

FIG. 9 illustrates a novel method of providing a light scattering means at the top surface of the encapsulating medium. Here, the top surface 86 of the encapsulating medium 74 may be sandblasted or optical irregularities may be molded into the top surface (such as small prism or pyramid shapes). Alternatively, the top surface may be coated with a light scattering substance, or a light scattering substance may be glued onto the top surface (provided the glue itself has an index or refraction higher than the encapsulating medium). Although this method of forming a light scattering layer at the top or outermost surfaces of the encapsulating layer 74 will scatter some light into the region above the panel 72, more than half of the light impinging on this surface will scatter downwardly toward the reflective layer 78. Also, generally half of the light emitted by the deformity 84 will be initially directed in a downward direction towards the reflective layer. Thus the light emitted by the optical fibers generally undergoes multiple internal reflections before being emitted from the panel, thereby causing relatively high optical absorption losses to be suffered by the panel of FIG. 9.

Figure 10:
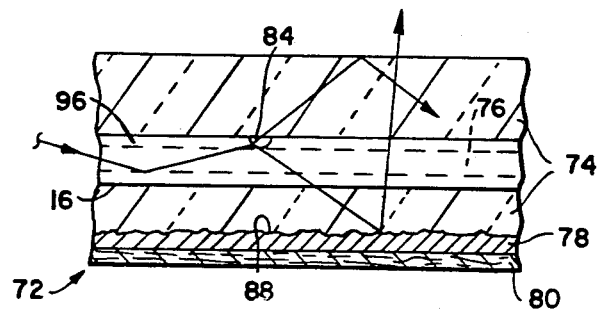

FIG. 10 shows an alternative method of providing a light scattering means for the panel 72 where the reflective surface 78 is given a texture so as to scatter light impinging on said surface from within the encapsulating medium. The reflective surface 78 is provided with a raised texture 88 which may be regular, geometric, irregular or random. The reflectivity of this surface may be caused by a coating of silver paint, chemically deosited metal, a layer of realtively low index of reflection material, or a combination thereof. Alternatively, a coating of opaque white paint, epoxy, or the like could provide a simple and effective light scattering layer. The efficiency of the reflective light scattering surface 88 of FIG. 10 is generally comparable to that of FIG. 9.

In the panel embodiment of FIG. 11, numerous light scattering particles 90 are added to the encapsulating medium 74. These scattering particles could be white or silver pigment particles, air bubbles, crystals, white or silver threads, particles or filaments of glass, quartz, plastic or the like, crystal fracture lines in the encapsulating medium; or similar reflective light scattering means. In this case, the encapsulating medium could be a translucent as well as a transparent medium which scatters the light from very fine pigment particles and the light scattering units may be confined to the top portion of the encapsulating medium in order to increase the uniformity of the light emission from the panel as a whole. A wide variation of special effects can be achieved by this method of light scattering, and efficiency may vary from very poor (if the particles are widely spaced or if the particles are opaque and shadow portions of the light output) to a modest efficiency. This method of light scattering would generally increase the number of reflections and/or refractions the light must undergo in order to be emitted from the panel, and thus the optical absorption becomes higher. Some specialized scattering particle means could be used that produce high light output, such as precisely aligned small cone mirrors, prism mirrors, or the like. Greater light output from a optical fiber light emitting panel may in some cases be achieved by combining two or all three of the methods shown in FIGS. 9 through 11.

FIG. 12 shows that specialized notches 84 may be cut into an optical fiber 16 such that light is scattered out of the optical fiber at angles that approcah the perpendicular relative to the longitudinal axis of the optical fiber. This novel notch design has a first wall 92 which is substantially perpendicular to the longitudinal axis of the optical fiber and a second wall 94 which is at approximately 45° to said axis. The perpendicular or first wall of the notch must be positioned closest to the light source so that light within the optical fiber will strike the first wall of the notch perpendicularly and will, for the most part, pass through said first wall with little back scatter and with little change in direction. It can now be seen that the high index of refraction material in the notch forms a small 45° prism. If the relative index of refraction of the encapsulating medium 74 is high enough, the light will be reflected off of the second wall of the notch by the process of total internal reflection (as for example occurs in a 45° prism used in a tank periscope) and is thereby bent upwards towards the top surface of the panel. Since the light is striking this top surface of the encapsulating medium at an angle approaching the perpendicular, the light will pass through the top surface without being trapped within the encapsulating medium by total internal reflection. If the notches 84 of this novel design are all arranged to directly face the top surface of the panel, and if a high degree of precision is maintained in forming these notches, a very high degree of light output efficiency can be achieved with most of the light being emitted perpendicular to the panel surface.

In variations of this novel notch concept, the notch may have a rounded or flat bottom portion between the first and second wall elements 92 and 94. The notch will still emit useful quantities of light if the encapsulating medium 74 has an index of refraction only slight greater than that of the core material 76. These notches may be positioned on all sides of the optical fibers so that light from some notches first strikes the reflective layer 78 where it is then reflected towards the top surface. Half, or some other useful portion of the notches may have the position of their first and second walls reversed so as to emit light travelling in either direction out of the fiber. Also, a "W" shaped notch may be designed using these same principles to emit light travelling in either direction. This same notch design has proven to work very efficiently when the encapsulating medium is air. When used in air, the second wall 94 should make an angle of 45° or less with the longitudinal axis of the optical fiber for best results. This notching method is therefore very useful as a general optical fiber light emission method for light emitting fabrics, light emitting optical fiber grids or any application using light emitting optical fibers.

FIG. 13 illustrates a method of scattering light directly from the interior of an optical fiber without defomring the cladding or core material. This method is discussed in copending U.S. patent application Ser. No. 320,576 to applicant which is incorporated herein by reference. In this method, light scattering means 90, such as particles of glass or plastic, air bubbles, reflective metal particles, refractive or reflective filaments, or the like are encapsulated directly within the core portion 76 of the optical fibers 16. The advantage of this method is that after light is scattered by a scattering particle, only those light rays having a large angle are able to escape through the cladding and into the surrounding encapsulating medium. These large angle light rays will thereafter easily pass through the upper surface of the encapsulating medium without being trapped by total internal reflection. Meanwhile, the small angle scattered light rays remain trapped within the optical fiber where they will continue to travel until encountering another scattering particle. Absorption losses are therefore minimized, for the scattered light either takes a direct route out of the panel or continues to travel in a low-loss optical fiber core material. Another advantage of this method is that the encapsulating medium need not have a high index of refraction relative to the core material 76, since it is not in optical contact with an optical fiber deformity which produces the scattering effect.

All of the laminated panels 72 using optical fibers shown in FIGS. 9 through 12 may be formed using optical fibers which have no cladding 96. In this case, the encapsulating medium 74 must have an index of refraction which is less than that of the core material 76 for the claddingless optical fibers 16. The deformities 84 shown in FIGS. 9 through 11 must now be of a type which notch, cut, or otherwise deform the local geometry of the core material 76. Since the encapsulating medium must now have a low index of refraction, the special notch design of FIG. 12 offers no particular advantage over the other methods shown, but the addition of scattering particles 90 to the core material as illustrated in FIG. 13 works equally well for claddingless optical fibers.

The methods of fabricating laminated optical fiber panels shown in FIGS. 9 through 13 can be extended in many useful ways. Foreign objects or substances may be added into the encapsulating medium 74 that serve useful functions other than those of light scattering; such as aesthetically pleasing shapes and/or objects; brackets, wires, threaded rods, and other attachment means; glass fiber mesh, wire screen or other strenthening means; electric wires, electric heating filaments, pipes, tubes, and the like. The panels 72 may contain more than one layer of light emitting optical fibers 16, and may be made thick to allow room for the optical fibers to be arranged in a three dimensional pattern. For example, the optical fibers may be strung in an up-down wave pattern across the width of the panel. Also, the panels may be given protective coatings, special optical coatings (such as antireflective coatings), special textured coatings, or other coatings for asthetic purposes, or the encapsulating medium may be dyed or otherwise colored so as to color the light emerging from the panel.

Patterns or lettering or the like may be printed on the top surface of the panel or overlays consisting of transparent or translucent sheets of paper, film, plastic, or the like may be glued or otherwise affixed to the surface of a laminated light emitting panel. In such applications, the panel provides back-lighting and support for said overlays which may be printed upon or otherwise have colored or black and white patterns, pictures, lettering, or the like applied thereon. By using a glue or other attachment means that is easy to remove without damage to the light emitting panel, an overlay may be changed as often as desired or is useful. This overlay and panel combination is of particular usefulness in the fabrication of signs, billboards, advertising display panels, decorative wall panels, instrument panels, and the like. Normally illuminated signs must be back lighted using large box-like housings containing suitable light bulbs, or they are illuminated by beaming high intensity lights on the sign using extensive light fixture hardware. Film or paper overlays on light emitting laminated panels, on the other hand, may be very thin and thus require a minimal support structure. The light source means may be contained in a suitable housing located in a utility area, on the ground, or in another easy to access location for convenient maintenance. Since the light source may be connected to the sign, billboard, or the like by an optical fiber lightpipe cable, great simplicity, convenience, and economy is achieved by the teachings of this invention.

A special and novel arrangement of the optical fibers on the back side of any light emitting panel can be employed that offers advantages over the more simple random gathering of optical fibers. Generally on panels whose front is covered with the nonwoven geometric arrays of this invention or with light emitting optical fiber fabrics of the prior art, the optical fibers are wrapped around the edge of the panel and are gathered together on the back of the panel where they are directed to a light source means. Heretofore, no attention has been given to the methods of achieving efficient and useful geometric arrangements of the fibers on the backs of the panels. Specifically, it is desirable to minimize the total lengths of the optical fibers used to construct light emitting panels, since currently the optical fibers are usually the single most expensive element of the panel. Also, the optical fibers should be arranged to facilitate cutting of the light emitting panels, such as when the last panel in a series is too wide for the available space, or when a panel must be cut around an obstacle. Another consideration is that the edge of the back of a panel must be smooth and free of protrusions for some short distance from said edge (for example ½ inch in the case of hanging ceiling tiles). This obstruction free edge allows space for clamping means, framing means, or other special attachment space needed along the panel edge. Lastly, the optical fibes must be arranged so that there are no sharp bends in the fibers which would cause excessive light leakage. For example, even when an optical fiber may be physcially bent in a turn having a ¼ inch turn radius without damage, this sharp turn will generally (except for very small diameter fibers) leak considerable amounts of light in the region of the bend.

For purposes of illustration, consider the back side of a light emitting panel of the type having a support or basic layer 66 or 80 as illustrated in FIG. 14. The optical fibers 16 are wrapped around the edges 98 and 100 of the panel and are then brought with smooth sweeping curves 102 to a loosely braided optical fiber bundle 104. The optical fiber bundle is given a protective jacket at 106 by encasing the optical fibers in a section of heat shrink tubing or the like so that the bundle of optical fibers now becomes the lightpipe 24. If the panel is to be plugged into a lightpipe cable harness that connects a number of panels to a central light source means, then the lightpipe 24 need only to reach to the edge of the panel as illustrated in FIG. 13. If the light source means is to be mounted onto the back of the panel, then it may be possible to eliminate the section of lightpipe 34 altogether and attach the coupler 28 directly to the end of the braided optical fiber bundle 102.

Note that if the panel of FIG. 13 is cut along the line A—A', and the left portion of the panel is discarded, the remaining right side of the panel can continue to receive light from the light source means. However, the design illustrated here cannot be cut vertically to the right of the line B—B' since the optical fibers which deliver light to the remaining front portion of the panel would be cut and the panel would remain unilluminated. A horizontal cut such as C—C' would cut all the fibers along the bottom edge of the panel, thus distorting the light output on the front of the panel to some degree. If the optical fibers are simply looped around the front of the panel so that a fiber entering the front of the panel from the top edge 98 simply crosses the panel to the bottom edge 100, then the cut C—C' would cut off half the light support to the front of the panel. If the fiber ends along the cut C—C' are given a reflective coating, then the remaining light output on the front of the panel can be made greater than half of its former value. Since the cut panel is also reduced in light emitting surface area, the cut C—C' may, in some cases (provided the fibers are looped), not appreciably reduce the light output of the remaining panel section.

FIGS. 15 through 18 show the back sides of light emitting panels similar to the panel of FIG. 13 wherein other efficient optical fiber geometries are employed. In FIG. 15, it will be noted that the optical fibers emerge along the two larger sides of the panel (upper 98 and lower 100) in the same manner illustrated in connection with the panel of FIG. 14. This panel is provided with two braided optical fiber bundles 108 and 110 which merge into a single lightpipe 24. It will be noted that the bundle 108 is spaced from the bundle 110 so that an aperture 112 can be cut in the central region of the panel with minimum distortion to the light output at the front of the panel.

FIG. 16 shows a light emitting panel in which the optical fibers emerge along the two short or end sides 112 and 114 of the panel. This arrangement allows the panel to be cut along a horixonal line F—F' without substantially affecting the light output per unit area on the front side of the panel. Like the panel of FIG. 15, this arrangement also includes two braided fiber bundles 108 and 110 which merge into a single lightpipe 24.

Figure 17:
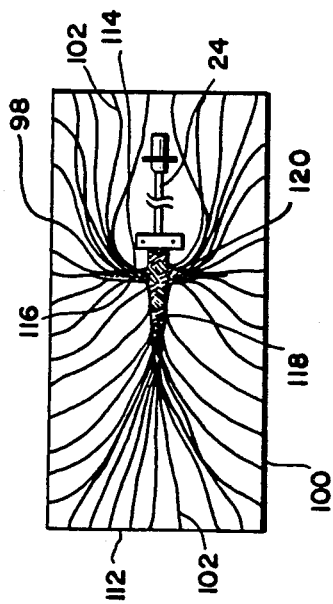

FIG. 17 shows a panel in which the optical fibers emerge along all four sides of the panel. This arrangement uses three braided fiber bundles 116, 118 and 120. Any cut into this panel would produce regions of lowered light output on the front of the panel.

Figure 18:
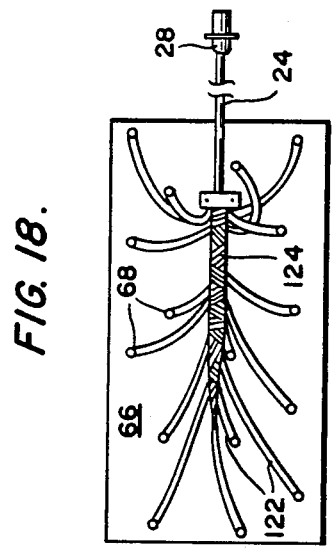

FIG. 18 illustrates an arrangement of optical fibers on the back of a panel of the type shown in FIG. 7 in which the optical fibers emerge from holes in the panel. A bundle of optical fibers 122 emerges from each hole at the back of the panel, and these bundles are gathered into a braided optical fiber bundle 124 in the same manner as the individual fibers in FIGS. 14 through 17. Note that the small fiber bundles 122 are curved into the larger braided bundle 124 in the same manner as the individual fibers in FIGS. 14-17.

The optical fibers 16 on tbe back of the light emitting panels of FIGS. 14-18 are gathered into a braided optical fiber bundle before being directed into a lightpipe and coupler portion of the optical fiber pathways. Optical fibers are made to enter the braided bundle in sweeping curves 102 having no unnecessary back loops and having a minimum path legnth from their points of origin on the back of the panel to the bundle. The braided bundle is affixed to the panel surface with a fastener 26, glue or the like at the point where braided bundle enters the lightpipe or coupler portion of the optical fiber pathway. If no special mounting conditions need to be considered, then the braided optical fiber bundle is run parallel to one edge of the panel to allow for maximum flexibility in cutting the panel. Right and left-handed versions of the panel may be manufactured to allow greater cutting flexibility, but the front surface pattern is kept the same for all different configurations of the braided bundle in order to avoid obvious differences in the light emitting geometry on the panel face when a matrix of such panels are mounted to form a contiguous surface. The loose optical fibers running from the panel edge to the braided bundle, and the braided bundle itself, are thoroughly saturated with epoxy or the like and thus firmly affixed to the panel back. This permits panels to be cut with a conventional saw, for otherwise the individual optical fibers would be ripped free by the saw blade action causing broken fibers and a generally messy appearance.

A single panel may have more than one briaded optical fiber bundle which may be directed into more than one lightpipe and coupler means. A single panel may therefore be coupled to more than one light source means or more than one light source means may be mounted on the back of a panel.

After a light emitting panel is cut with a saw of the like, light that would normally travel around the optical fiber pathway is simply beamed out of the cut fiber ends and into the room or surroundings. This is generally an undesirable condition, since it would cause the bright beams of light to be projected behind the panel where they would illuminate empty space or, worse yet, the light may be seen through seams between panels and walls which would greatly detract from the aesthetic appearance of the finished product. Also, this would be unrecovered wasted light. Consequently, it is important to give the cut fiber ends a reflective coating which would reflect this unused light back into the lightpipe circuit where it could be put to use.

The cut optical fibers can be given a reflective end by carefully polishing the fiber ends until they are glass smooth and then using chemical means or the like to apply a thin coating of some highly reflective metal such as silver or aluminum. A protective coating of epoxy or the like could next be applied to protect the metal coating from environmental factors. However, this would generally prove to be a highly expensive and time consuming operation, and thus it is unsuitable for mass production panels.

The preferred method of dealing with the cut fiber ends of light emitting panels constructed in accordance with this invention is to first insure that the fibers are arranged into epoxy-filled braided bundles on the back side of the panel as described earlier. In this way, almost all of the cut optical fibers will generally be in one localized region after the cut is made instead of being spread across the entire back surface of the panel. The cut bundle end is next sanded reasonably smooth using fine grit sandpaper, and the sanded cut ends are given a coating of very white paint, or white epoxy (transparent epoxy having titanium oxide or other pigment added to color it white), or the like. Other reflective liquid coatings may be used in place of white paint, but white paint will generally prove more satisfactory. A protective coating may then be applied over the white paint to provide additional environmental protection.

The various arrangements of braided and nonbraided optical fiber bundles described in connection with the light emitting panels of FIGS. 14-18 can be replaced by a lightpipe harness assembly on the back of a light emitting panel or along the edge of a light emitting fabric. Such a harness would connect small bundles of optical fibers with a light source located on the back of the panel, or with larger lightpipe cables that deliver light to the panel.

A novel "stacked lightpipe harness" is herein described which consists of a stack of glass or plastic rods, one rod for each small optical fiber bundle, which connect said bundles to a light source means. This type of harness can be made very inexpensively and may, in some cases, be less expensive than the braided optical fiber bundles described previously. This is particularly true if the stacked harness is made as a single unit of cast optical quality plastic.

If a light emitting panel is formed using the method of light scattering shown in FIG. 13, whereby optical fibers having internal light scattering particles are used, then it is advantageous to tie the optical fibers into small bundles as soon as they reach the edge of the grid, panel, or fabric, and immediately connect them to a lightpipe harness means. Since the internal light scattering optical fibers emit light throughout their length, all portions of the optical fibers that are not part of the grid, panel surface, or fabric emit light that is wasted. As much as half the emitted light would be wasted on the backs of the panels shown in FIGS. 4 through 18 if internal light scattering optical fibers were used. The novel harness means herein described is particularly suitable for use with lighting fixtures that employ such internal light scattering optical fibers.

Figure 19:
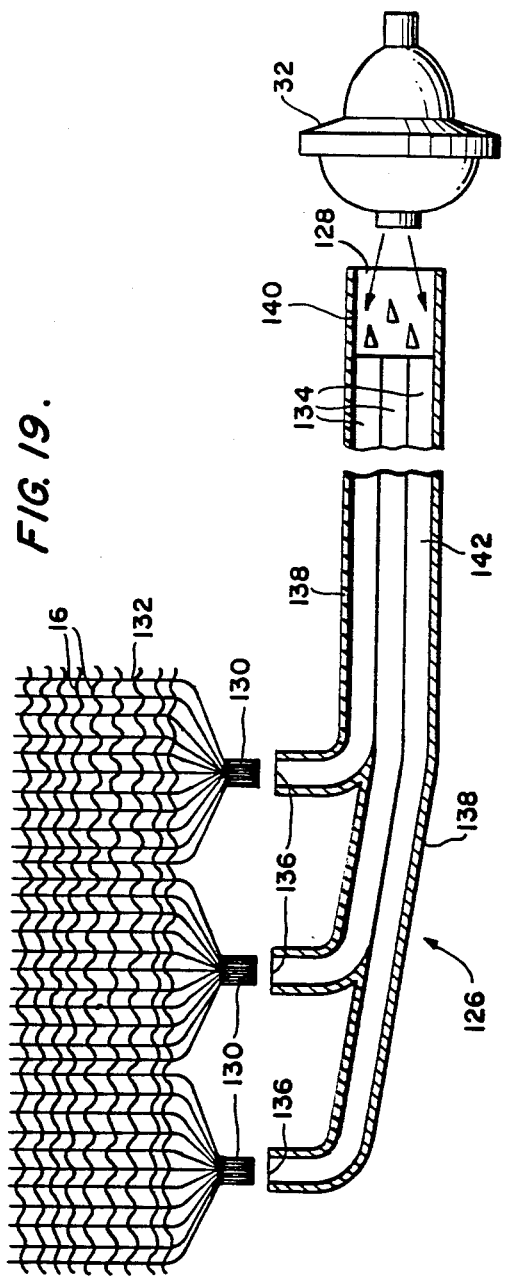
FIG. 19 is a partially sectional diagram of a lightpipe harness assembly for an optical fiber light emitting grid.

FIG. 19 is a diagrammatic illustration of a stacked lightpipe harness 126 constructed in accordance with the present invention. In this particular example, light is beamed into the input optical window 128 for the harness by the lightpipe illuminator bulb 32 and exists the harness into several optical fiber bundles 130, each of which in turn feeds the light into a section of light emitting fabric 132. Light may also be beamed into the input optical window 128 by means of any other suitable light source or source of electromagnetic radiation. The optical fiber bundles 130 may be arranged along the edge of a geometric grid frame 18, a light emitting optical fiber panel of any type, or any other type of optical fiber lighting fixture means.

The stacked lightpipe harness 126 is formed of a number of plastic (or glass) rods 134 which are circular in cross-section where they are fused at output windows 136 to an optical fiber bundle 130. The rods are then slowly changed in cross-section until they have a rectangular cross-section, but all positions along the rod maintain the same cross-sectional area so that the average angular divergence of the light passing through the rod remains unchanged. The individual plastic rods are bent, and may be twisted, so that they come together to form a stack of rectangular rods in which all the rods have the same height and width. The resulting stack has a width equal to the width of a single rod and a height equal to the combined height of the N rods (N=3 in this case). Within the stack, the individual plastic rods are bonded together with a transparent bonding means which allows this bonded region to have the same index of refraction as the rest of the plastic in the rods. The entire arrangement of rods is then given a reflective coating 138 on its outside walls with the exception of its optical windows. This reflective coating could be a transparent substance having a relatively low index of refraction, or a reflective metallic film, or a combination thereof. A lightpipe diode device 140, to be described, may be built into the end of the harness 126 near the input optical window 128 as shown. The entire stacked lightpipe harness may be bent and/or twisted as needed to fit on the back of a light emitting panel.

Clearly the entire arrangement of rods 134 could be fabricated as a single molded plastic part if desired in any given application. However, for custom work, where only small numbers of harnesses are being fabricated, it would be desirable to make the harnesses from a series of separate bonded rods as needed. The rods could be heated to soften them and then bent to fit the panel or other application. The rods would then be bonded together, trimmed to length, the optical windows would be polished, and the harness would be affixed in place to the bundles 130.

The cross-sectional areas of the optical windows 128 and 136 are an important consideration of this novel harness design 126. This design features a relatively large input optical window 128 with the entire stacked rod portion 142 of the harness serving as an optical mixer. Light can therefore be focused through the central portion of this input optical window, by a variety of optical devices without the need to provide misalignment mirrors or the like to capture stray light near the edge of the window. If the harness were composed of many optical fibers, the input optical window would have to be illuminated uniformly to insure uniform light input to all the optical fibers. In this stacked harness design, the input light can illuminate the input window non-uniformly. The optical mixer portion of the harness will insure that the light is distributed uniformly along the N rods according to their relative cross-sectional areas.

The output optical windows 136 of this stacked harness design are made with diameters equal to the diameters of the tighly packed ends of the optical fiber bundles 130. The output optical windows are each fused to the end of an optical fiber bundle with epoxy or the like. To improve the optical coupling even further, the claddings may be stripped from the optical fibers near the ends of the optical fiber bundles, and the ends of these bundles can then be heated slightly and compressed into a solid rod. The core portion of the optical fibers 16, the epoxy used to fuse a rod 134 to a bundle 130, and the plastic used in the harness rods 134 should all have the same index of refraction for maximum optical coupling. This junction region will then be given a reflective coating to prevent light leakage from the sides of the junction region. Since the harness rod 134 and optical fiber bundle 130 have the same diameter, the angular divergence of the light passing through this junction region is unchanged.

The stacked lightpipe harness 126 of FIG. 19 can be modified and adopted to many applications and circumstances. The portion of the harness near the input optical window 128 could be split lengthwise (horizontally in FIG. 19 starting at the right) into two or more branches so that two or more input optical windows are formed. In this way, two or more light sources could be attached to the same harness. As long as a sufficient length of harness remains having a full cross-sectional area to serve as an optical mixer, then the light from multiple light sources will be distributed uniformly among the output optical windows 136.

The stacked lightpipe harness 126 may have any number of lightpipe rods 134 and output optical windows 136. It is not necessary that these rods be circular in cross-section at their output optical windows for they may remain as rectangles having the same dimensions as the remainder of the rods, or they may have any other useful cross-sectional shape which conforms to the cross-sectional shape of a fiber bundle 130. The lightpipe rods need not all have the same cross-sectional area, for if the optical fiber bundles 130 have different diameters, then it would be advantageous for each lightpipe rod at the output window 136 to have the same cross-sectional area as the bundle it mates with. However, if the lightpipe rods have different cross-sectional areas, it would be of further benefit to have the rectangular portions of each rod vary in thickness according to the required cross-sectional area, but remain at some constant width so that the rods can still be conveniently stacked to form a larger rectangular rod as the body portion 142 of the lightpipe harness. The portions of the stacked lightpipe harness near the input or output windows may gradually flare outwardly or inwardly to cause the light to decrease or increase in angular divergence, but this is acceptable provided the light being beamed into each of the output optical windows is changed by the same amount.

Instead of connecting together the optical fiber bundles 130 of a single panel, grid, or light emitting fabric, the stacked light harness 126 may be used to connect together a series of panels, grids, or the like. It is often desirable to connect a number of separate light emitting panels, light emitting geometric grids, fiber optical lightpipe fixtures, or the like to one or more light sources. It is usually most convenient to employ a lightpipe harness 142 for this purpose whereby a single lightpipe, or bundle of lightpipes (which may have branches) is fitted with a series of male couplers, or female couplers, or both. A very important consideration in such lightpipe harnesses is that unlike electrical harnesses, where all input or output coupling means on the same wire have the same electrical potential, all positions along a lightpipe cable are not equal. For example, light travelling from a source means diminishes in intensity as portions of it are beamed into successive output branches. If a string of equal sized light emitting panels are to be connected to a single light source, then it would normally be desirable to divide all the available source light equally among all of the individual panels. If there are N panels, then each output coupler must be proceeded by a lightpipe divider means which splits off exactly 1/Nth of the available light to an individual panel. This process is complicated by the fact that the main lightpipe has different intensities of light at different positions along its length. The situation is further complicated by the usual requirement that in any given application, there may be any number of panels connected to the light source. Thus a set of dividers designed for one number of panels would not usually work for a different number of panels connected to a similar light source.

Figure 20:
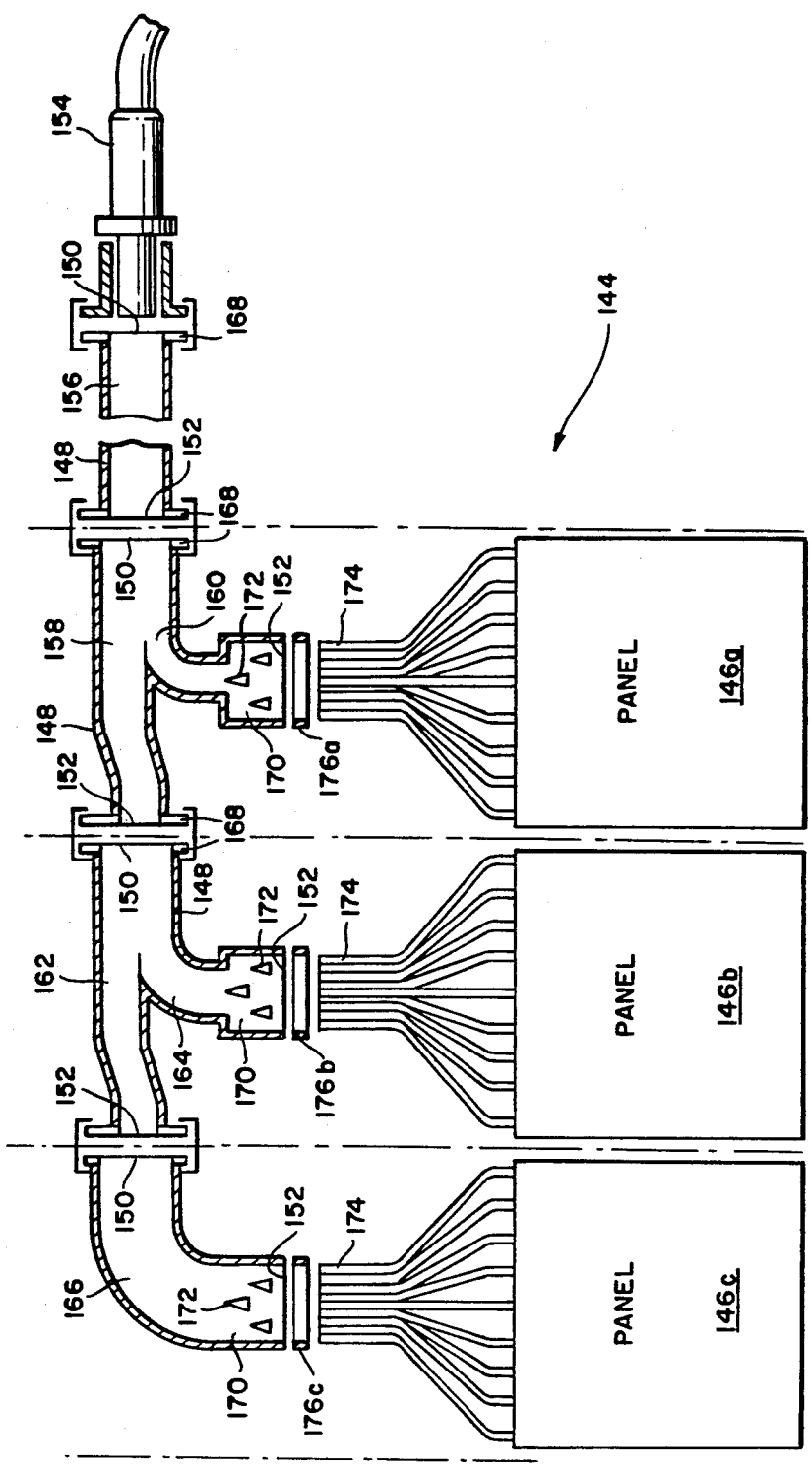
FIG. 20 is a partially sectional diagram illustrating a segmented lightpipe harness assembly for a plurality of light emitting optical fiber units.

In FIG. 20, a new and unique lightpipe cable harness system 144 is illustrated which allows all the input light to be equally divided among any number of similar light emitting panels 146 connected to the same light source. Only one set of lightpipe divider means are needed for any number of panels, and this novel harness system does not increase the angular divergence of the light passing through the harness so that all panels receive light having the same angular divergence. As previously noted, the scatter of light out from a light emitting optical fiber device is highly dependant on the angular divergence of the light which enters the device. If, for example, the angular divergence increased along the harness, then each panel would receive a greater angular divergence and would therefore output its light with a different angular spread and perhaps a different intensity as well. The harness system 144 is a segmented lightpipe harness arrangement whereby the harness is built in segments, one segment per panel. These separate segments may be permanently affixed together at the time of manufacture to form a single integrated harness, or they may be manufactured as separate harness segments that are plugged together at the time of installation to form a harness of any desired length. Alternatively, the individual segments may be affixed one per panel so that the harness is assembled as the panels are connected side by side.

The individual lightpipe and sections of the harness 144 are made of solid optical quality transparent glass or plastic. These lightpipe rod segments are given a reflective coating 148 along all outside walls except for the optical windows 150 and 152 through which the light enters or leaves the rods. This reflective coating could be a relatively low index of refraction transparent coating which traps the light within the rod by means of total internal reflection, or it may be a metallic reflective coating, or combinations thereof. Light is input to this harness by means of a conventional optical fiber lightpipe and male coupler 154, or it is possible to connect the segmented lightpipe harness directly to the light source if desired. The first segment encountered by the light is simply a section of lightpipe rod 156 of any desired length. This section of lightpipe rod may be provided with bends and turns, and may have branches that lead to other segments of the harness. Its main function is to direct the light from the light source or light source lightpipe cable means to the beginning of the panel output segments of the harness. Additional sections of lightpipe rod may be inserted between panel output segments in applications where not all the panels are light emitting panels.

The section 156 of lightpipe rod directs its light flow into a segment of lightpipe 158 which is the same length as one light emitting panel. This segment has an optical branch 160 which splits off exactly one third of the light and directs it into panel 146a as shown. Two thirds of the light is made to continue to the next segment 162 having a branch 164 which splits off half of the remaining light and directs it into panel 146b. Then, all of the remaining light is beamed into the remaining segment 166 which does not contain an optical branch and simply beams all light received into panel 146c. The optical branches are of a very simple design which simply divides the cross-sectional area of the rod segment between the two legs of the branch; the ratio of areas thereby determining the ratio of light distribution between the two branches. After the branch, the two legs continue with reduced cross-sectional area as shown. The main branch terminates in an output optical window 150 which is made to butt up against the next section of the harness. Each harness section 158,162,166 begins with a lightpipe rod having the same standard cross-sectional area as the preceeding rod. The smaller rod output window 152 of a preceeding section always butts against the larger area input window 150 at the beginning of a section. Light thereafter passes from section to section without concern for missalignment problems. The only light losses at these junctions between sections are due to reflections which can be minimized by optical coatings.

The individual sections may be equipped with flanges 168 on either end which may be clamped or affixed to one another by any convenient mechanical method. Ideally, the clamping means would be simple to allow rapid coupling at a field site.

In each lightpipe harness section, the leg of the optical branch which leads into the panel, called the secondary branch, terminates in an optical mixer 170. The optical mixer has a cross-sectional area equal to or greater than the preceeding section of secondary branch rod. The transition between the secondary branch rod and the optical mixer element is abrupt, as shown, so that the angular divergence of the light entering this optical mixer remains unchanged. The optical mixer may contain optical diode means 172, to be described, and the cross-sectional area of the optical mixer is chosen to equal that of the associated optical fiber bundle 174 from the respective panel.

Color correction filters 176 may be placed between each optical mixer element and the associated optical fiber bundle. In preferred embodiments, each color filter is different, with the filter 176a being placed in the path of the light being beamed into the panel nearest the light source. Filter 176b is placed in the path of the light being beamed into the second panel from the light source, and filter 176c in the path of light being beamed to the panel farthest from the light source. Light passing through the harness will generally change in color due to selective absorption by the glass or plastic, and the color correction filters are used to counteract this selective color absorption. Since the light passing through filter 176a has travelled through the least amount of harness medium, this filter has the least amount of color correction; filter 176b has a greater amount of color correction; and filter 176c has the most color correction.

Light passing through a color correction filter 176 next passes into a length of optical fiber bundle 174 and is subsequently distributed among the light emitting optical fibers of the panel using methods discussed earlier. The individual lightpipe harness sections may be firmly affixed to each panel at the time of manufacture, or the harness sections may be provided with coupling means to be attached to each panel at a field site. If the harness sections are affixed to the panels at the factory, a low light loss bonding can be achieved at the junction between each harness section and the optical fiber bundle.

The secondary harness branch lines 160,164,170 may have their cross-sectional areas changed slowly along their length. This will cause a change in the angular divergence of the light passing through, but if all the cross-sectional areas are made to change by the same amount throughout the harness, it will change the light being beamed to all the panels by the same amount.

Each section of the harness will absorb some small percentage of the light passing therethrough. Therefore, if the two branch dividers 158 and 162 shown in FIG. 20 have ratios of exactly 66/33 and 50/58, the three secondary bracnhes will not receive equal amounts of light intensity. If 10% of the light passing through a harness section is lost to absorption, then the two branched sections 158 and 162 should have ratios of 70/30 and 51/49 respectively (to the nearest whole number).

The harness 144 is shown to distribute light among a number of panels, but a smaller harness arrangement may be fabricated for use on the back of a single large panel, or along one edge of a large light emitting drapery, or the like. The segmented harness may be designed so that different intensities of light are distributed to different panels or output means. For example, it may be desirable to distribute less light to a cut panel then to a complete panel. The corss-section of the various lightpipe rods that make up the harness may be relatively varied to control the amount of light provided to any output unit.

The lightpipe harnesses, the braided optical fiber bundles, the geometric grids, the light emitting panels, and the couplers, diodes, and other optical elements of this invention may be designed to transmit infrared, visible light, or ultraviolet light or any combination thereof.

In most lightpipe lighting fixture applications, it would be desirable to install an optical diode in or near the various coupler means employed. Such diodes would be positioned so that light may easily pass into said lighting fixtures but would be prevented from returning back toward the light source. Such diodes are also used in the harness structures of FIGS. 19 and 20. High precision optical diodes are not requied in most lighting fixtures, since the intensity of light involved is relatively low and cost reduction is of prime concern.

FIGS. 21 through 26 show a number of simple and inexpensive optical diodes which may be employed in the couplers and harness structures of this invention. Unlike more sophisticated optical diodes, the optical diode devices of FIGS. 21 through 26 all increase the angular divergence of the incoming light. For most optical fiber applications, this would prove to be a severe problem, sicce some of the light which is entering the diode at near the critical angle of the optical fibers will have its angle increased so that it will be greater than the said critical angle and will therefore no longer be trapped within the optical fibers which follow. However, in lightpipe lighting fixtures, it can be assumed that light from the light source is being made to travel down low loss optical fiber lightpipes which have a relatively small critical angle. On the other hand, the lighting fixture would very likely be made of inexpensive, high loss plastic optical fibers or the like which have a relatively large critical angle. Therefore, even though a diode at the input to the fixture will increase the angular divergence of the incoming light, the critical angle will also be increased so that little light will be lost due to this effect. The increase in angular divergence of the light can prove to be an advantage in many lighting fixtures. For example, the light scattering means illustrated in FIGS. 9, 10 and 11 would all be improved if the light is given a high degree of angular divergence, since more of the light would scatter out of the optical fibers at high angles thus decreasing the percentage of light trapped in the encapsulating medium by total internal reflection. A greater percentage of the light emitted from light emitting geometric grids and light emitting fabrics, which do not have encapsulating mediums or coatings, will emerge perpendicular to the grid or fabric surface if the incoming light has a higher angular divergence. Thus, in the case of optical fiber lighting devices, the novel lightpipe optical diodes shown in FIGS. 21 through 26 serve to both trap light within the lighting fixture means until it is emitted or absorbed and also serve, in some cases, to increase the perpendicularity of the emerging light.

It should be noted that a substantial portion of the back flowing light (light travelling from left to right in FIGS. 21 through 26) will be able to pass through the optical diodes and into the lightpipe cable means on the right. The structures shown in these Figures are only for the purpose of illustrating the concepts involved, and it can be expected that well engineered diodes, using these concepts, could reduce the backflow to 25% or less. Such high backflows are acceptable in lighting fixtures, since the main purpose of such diodes is to salvage as much of the backflow as possible at low cost.

Figure 21:
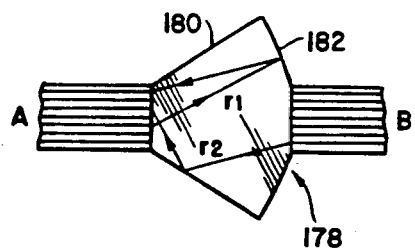
FIGS. 21–26 are diagrammatic illustrations of optical diode assemblies.

In FIG. 21, a very simple optical diode 178 is shown consisting of a simple optical chamber made of a cone mirror 180 on the left and a sperhical mirror 182 on the right. Light travelling substantially parallel to the longitudinal axis from lightpipe A to lightpipe B will be able to pass through to B, thus forming an undesirable backflow. Light rays, such as $r_1$, emerging from A at an angle will then strike the spherical mirror and be reflected back into the lightpipe A. Lightrays emerging from lightpipe B will either beam directly into lightpipe A, or they will first strike the conical mirror and then be reflected into lightpipe A, such as lighttray $r_2$, at a higher divergence angle.

Figure 22:
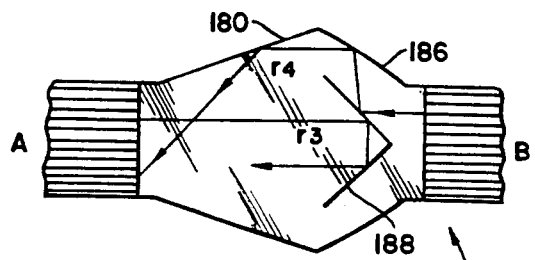

FIG. 22 shows an optical diode 184 having a chamber similar to that of diode 178 with the addition of a second conical chamber defining mirror 186 and the provision of a conical mirror element 188 directly in the path of the light flow. This conical mirror element 188 prevents excessive backflow from lightpipe A to B by presenting a corner reflecting mirror surface to light emerging from A, such as lightray $r_3$. Light emerging from B must zig-zag between the back side of the conical mirror 188 and the conical back wall 186 of the optical chamber as shown by lightray $r_4$. This design increases the angular divergence of all light rays emerging from lightpipe B.

Figure 23:
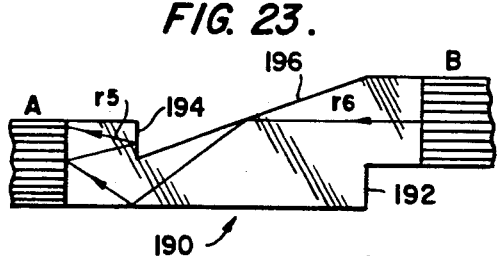

Whereas FIG. 22 demonstrates a diode in which the main mirror elements are all conical in shape, FIG. 23 shows a diode 190 in which the main mirror elements are all flat mirrors. Two perpendicular mirrors 192 and 194 reflect light emerging from lightpipe A back into lightpipe A as shown by lightray $r_5$. A relatively large flat mirror element 196 is placed at a shallow sloping angle as shown to allow a lightray, such as $r_6$, to pass around the upper perpendicular mirror element 194 and into the lightpipe A. This example further shows that the optical diode need not be symmetrical around the central horozontal axis. This type of diode arrangement may be useful when combined with an optical branch device whereby more than two lightpipe cables enter and leave said device.

Figure 24:
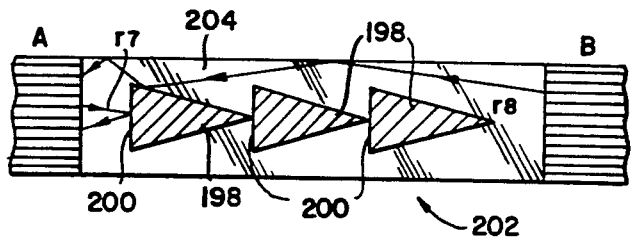

FIG. 24 discloses the use of floating conical mirrors 198, each having a flat mirror base 200, in the design of an optical diode device 202. In this design, a string of several such flatong cone mirrors are arranged along the center line of an optical mixer chamber 204. Lightrays, such as $r_7$, emerging from lightpipe A, will, in most cases, eventually strike the flat base 200 of one of the cone mirrors and thereby be sent back into the left-hand lightpipe A. Light rays, such as $r_8$, emerging from lightpipe B for the most part will strike a conical mirror element which will increase the angular divergence of the lightray while still allowing it to pass through the device to lightpipe A. Any number of these flat-based floating conical mirror elements may be placed in an optical mixer device to produce a diode effect. These conical mirror elements may be relatively large or small and may be arranged in any useful pattern.

Figure 25:
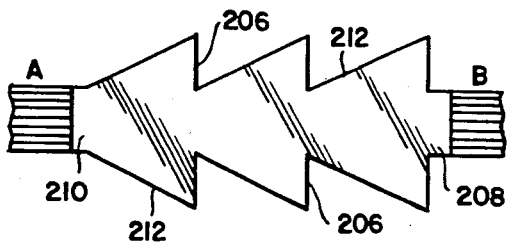
Figure 26:
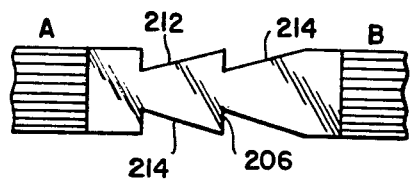

FIGS. 25 and 26 both illustrate conical mirrors used to form the external walls of the optical chamber. In FIG. 25, the cone mirrors form flat vertical mirror flanges 206 that extend beyond the diameter of the chamber ends 208 and 210 as well as inclined conical mirror surfaces 212. In FIG. 26, the cone mirrors are formed by circular inclined grooves 214 which are cut into the cylindrical walls which form the optical chamber. These grooves form the vertical mirrors 206 and inclined mirrors 212.

Figure 27:
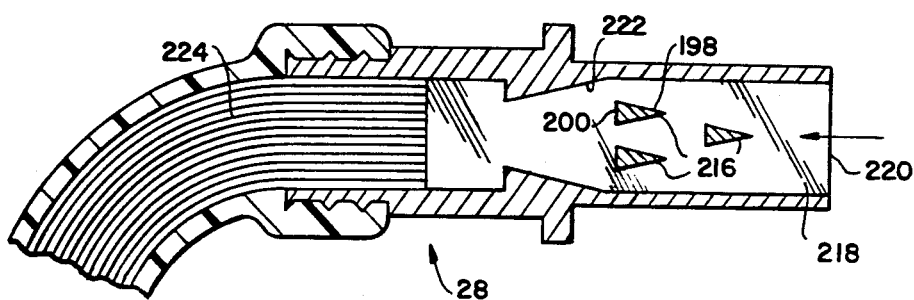
FIG. 27 is a sectional view of an optical coupler including an optical diode assembly.

FIG. 27 illustrates a simple optical coupler 28 which has a built-in optical diode means of the type also used in the harnesses of FIGS. 19 and 20. Here, a plurality cone mirrors, 216 similar in construction to the mirrors 198 of FIG. 24, are placed in an optical mixer chamber 218. Light entering this male optical coupler through its optical window 220 will typically encounter either one of the cone mirrors or the circumscribed conical mirror 222 and be deflected into the optical fiber lightpipe 224 with an increased angular divergence. Light backflowing out of the optical fiber lightpipe has a high probability of encountering one of the flat mirror surfaces 200 and thus being reflected back into the lightpipe 224. The floating conical mirrors with flat mirror bases can be made microscopic in size with thousands of them arranged to form a dense layer perpendicular to the light flow through the coupler. Two or three such layers could be arranged in close proximity with each cone having a very small apex angle. Such a diode arrangement could be designed to have very small back flow and to only slightly increase the angular divergence of the forward beamed light.

In FIGS. 21 through 27, the optical chamber portion of the diode is shown to be a solid piece of glass, plastic, or other solid transparent substance. The chamber could also be a hollow mirror lined cavity filled with air, gas, or a vacuum. The mirrors may be chemically or vacuum deposited metal or the like, or in some cases the mirrors may be relatively low index of refraction material, a layer of relatively low index of refraction transparent material, or a layer of relatively low index of refration transparent material which is in turn coated with a reflective metal layer. Some of the optical elements may be given unconventional curvature as determined by computer analysis.

A lightpipe rod or optical mixer chamber with a gradually increasing diameter in a forward direction will decrease the angular divergence of the light travelling therethrough in the forward direction, while a lightpipe rod or optical mixer chamber with a gradually decreasing diameter in the forward direction will increase the angular divergence of light travelling in such direction. This principle can be used to counteract the increase in angular divergence which occurs with the diodes of FIGS. 21 through 26. For example, a glass rod having a gradually increasing cross sectional area (in the direction B to A in FIGS. 21-26) could be placed between the optical diode and the fiber bundle A in FIGS. 21-26. By a proper choice of parameters, the two opposed divergence effects resulting from this combination could be made to cancel one another so that the combination would result in substantially no change in the angular divergence of the light passing through the diode. Obviously, this combination is useful only where the fiber bundle or lightpipe A is of larger diameter than the bundle or lightpipe B.

Industrial Applicability

The light emitting optical fiber assemblies of the present invention are used to provide asthetic and decorative internal lighting fixtures, lighted wall and utility panels, and lighted signs and other outdoor lighting panels. The individual panels, fixtures, lightpipe harnesses and optical diodes of this assembly may be effectively employed in combination with a wide variety of devices which use, transmit or emit electromagnetic radiation.

I claim:

1. A light controlling diode assembly including a transmitting optical unit having a light input end and a light output end and optical diode means mounted in said optical unit between the input and output ends thereof, said optical diode means including a first surface means positioned to face said light output end and operative to reflect light passing from said output end toward said input end back to said output end and second surface means positioned to deflect light from said input end toward said output end.

2. The light controlling diode assembly of claim 1, wherein said transmitting optical unit includes outer wall means defining a light transmitting optical chamber, said outer wall means being formed to reflect light impinging thereon back into said optical chamber.

3. The light controlling diode assembly of claim 2, wherein said outer wall means are formed to include said first and second surface means.

4. The light controlling diode assembly of claim 2, wherein said first and second surface means include at least one light reflecting unit mounted within said light transmitting optical chamber.

5. The light controlling diode assembly of claim 4, wherein said light reflecting unit includes first and second inclined light reflecting surfaces which meet at a central apex, said central apex being positioned adjacent said light input end and said first and second inclined light reflecting surfaces being inclined away from said central apex and extending toward said light output end.

6. The light controlling diode assembly of claim 5, wherein said light reflecting unit is a conical mirror having a third reflecting surface extending between said first and second inclined light reflecting surfaces in spaced relationship to said central apex.

7. The light controlling diode assembly of claim 6, wherein a plurality of said conical mirrors are mounted within said light transmitting optical chamber.

* * * * *